Sept. 6, 1927.
W. L. MONRO
1,641,896
METHOD AND APPARATUS FOR ANNEALING AND COOLING SHEET GLASS
Filed Feb. 12. 1924
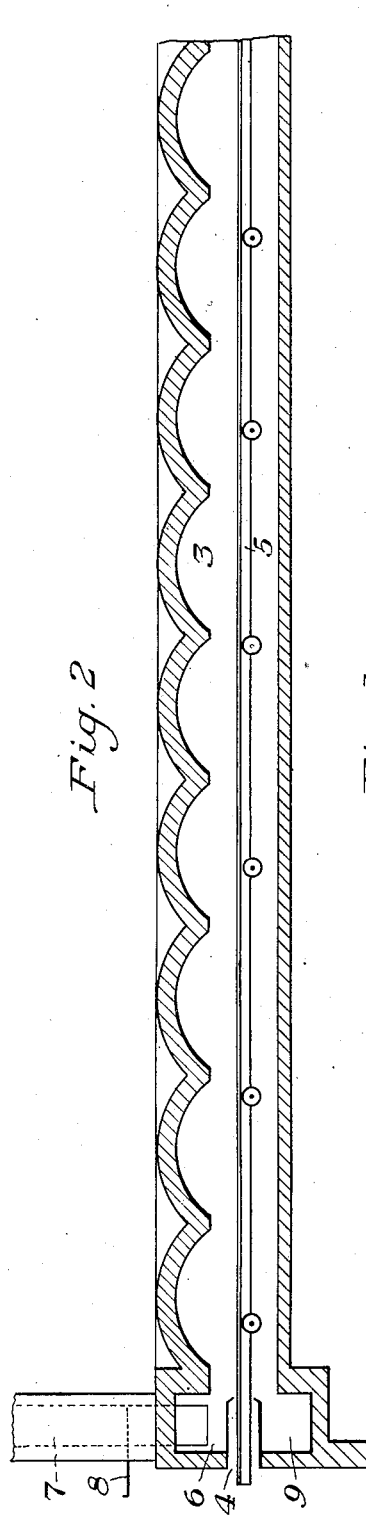
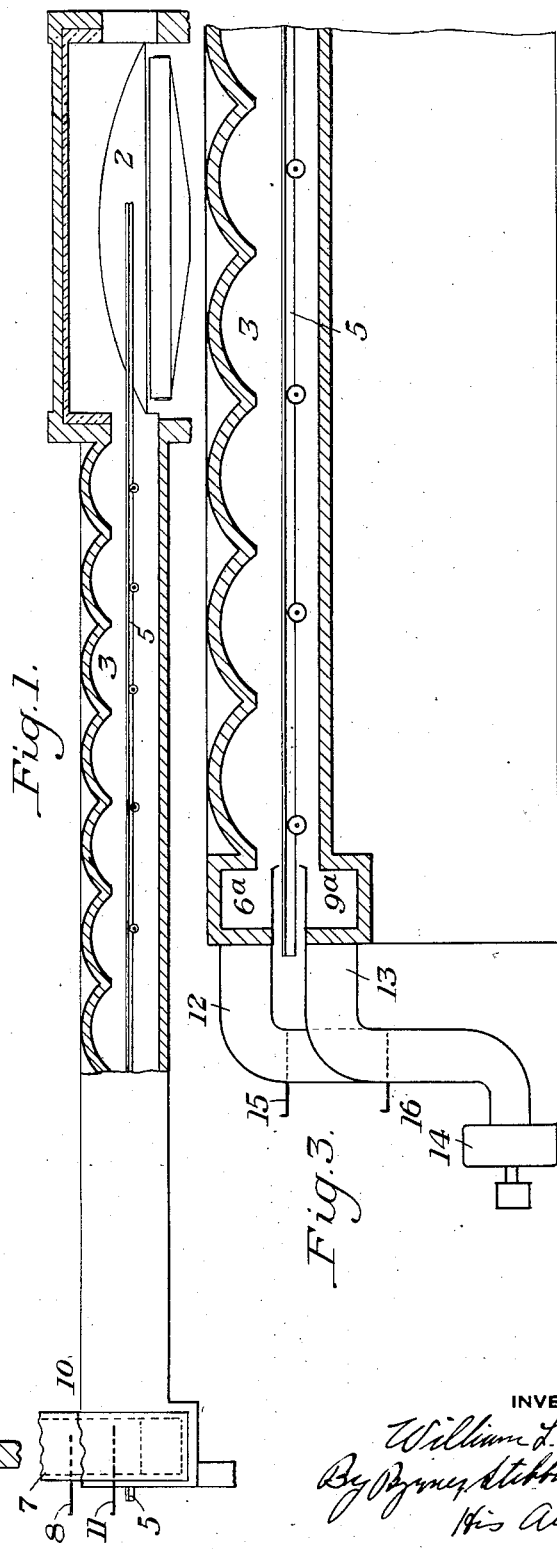
INVENTOR
William L. Monro
By Byrnes, Stebbins & Parmelee
His Atty's Patented Sept. 6, 1927.

1,641,896

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

METHOD AND APPARATUS FOR ANNEALING AND COOLING SHEET GLASS.

Application filed February 12, 1924. Serial No. 692,248.

This invention relates to a method and apparatus for annealing and cooling sheet glass and is particularly useful in connection with apparatus having as a source of heat a chamber wherein a previous operation is performed upon the glass, such as a flattening oven or a glass drawing apparatus, although the invention is not so limited.

In the annealing and cooling of sheet glass, it has been found that if a leer tunnel of usual construction is used and all of the gases supplied to one end thereof are permitted to take their natural course through the tunnel, the gas stream above the glass will be hotter than the stream below and as a result, the lower face of the glass sheet cools more rapidly, so that the glass is warped or bowed when delivered from the leer tunnel. This is probably due to the fact that the hotter gases in the tunnel naturally rise to the upper portions thereof, while the cooler gases remain at the bottom. As a result of this condition, it is found that in the ordinary leer the gases flow along and leave the upper portion of the tunnel at relatively higher velocities, while at the lower portion thereof, below the glass the gas movement is more sluggish so that cold air enters the lower part of the delivery end portion of the leer tunnel, thus accentuating the unequal temperature conditions from top to bottom of the leer tunnel. This condition is accentuated by the shrinkage of the gases in cooling as they flow through the tunnel.

To overcome this, I provide for supplying flat hot glass to a horizontally extending leer tunnel, passing streams of gases through the leer tunnel above and below the glass level and increasing the natural velocity of the lower stream. This is preferably accomplished by amplifying the natural draft in the lower portion of the leer tunnel and as a result, temperature conditions from top to bottom of the tunnel are more nearly equalized and the cooling effect of the two streams is so changed as to substantially equalize the rate of heat loss from the two surfaces of the glass sheet.

In the accompanying drawings, which illustrate the preferred embodiment of my invention as applied to the flattening oven and connected leer tunnel for working on glass formed by the cylinder process,—

Figure 1 is a side elevation, partly broken away, of a flattening oven and connected leer tunnel embodying my invention;

Figure 2 is a vertical section to enlarged scale of a portion of the apparatus shown in Figure 1; and Figure 3 is a view corresponding to Figure 2, but showing a slightly modified form of apparatus.

In the form of Figures 1 and 2, I show a flattening oven 2 connected to a horizontally extending leer tunnel 3. The oven 2 is heated in any desired manner and hot gases from the oven pass through the leer tunnel toward the delivery opening 4. Leer rods 5 of any suitable construction are placed in the leer tunnel for supporting the glass as it travels therethrough. When the leer is in operation, these rods are effective for supporting the glass sheets in such manner as to form a substantially continuous partition through the leer tunnel, so that the hot gases from the flattening oven 2 are divided into two streams; one above and one below the glass sheets.

It will be understood that the term "flattening oven" as used herein refers to the oven as a whole and is intended to include not only that portion of the apparatus where the glass is actually flattened, but also the so-called dummy oven, cooling oven and piling oven, as will be well understood by those skilled in the art.

Immediately above the delivery opening 4, I provide a cross flue 6 connected to a stack 7 having a damper 8 therein, and immediately below the opening 4 I provide a similar draft apparatus comprising a cross flue 9 and a connected stack 10 having a damper 11 therein. By suitably regulating the dampers 8 and 11, the relative velocities of the gas streams above and below the glass level may be regulated both absolutely and relatively to each other. This is particularly important in connection with the lower stream, and if desired, the upper cross flue and connected stack may be dispensed with entirely. It is, however, useful for close adjustments, especially in relatively adjusting the flows of the gas streams.

The lower cross flue and connected stack serve to amplify the velocity of the lower stream and thereby reduce the tendency for outer air to enter the lower portion of the leer tunnel from its delivery end. This improves the product.

Figure 3 illustrates an apparatus which is similar to that shown in Figures 1 and 2, except that the cross flues 6ª and 9ª are connected to conduits 12 and 13 leading to a suction fan 14 and are provided with dampers 15 and 16 respectively.

I thus provide for annealing and cooling sheet glass by suppying streams of gases above and below the glass level and for controlling the velocity of the lower stream and preferably that of both streams. It will be found in practice that the upper stream has a naturally higher velocity which serves to keep cold air out of the ordinary leer tunnel above the glass, but that unless suitable provision, such as provided by this invention, is made for increasing and preferably controlling the velocity of the lower stream, it will become sluggish, and cold air will enter the leer and affect the flatness of the product.

A further advantage of this invention is the fact that by its use the leer tunnel may in many cases be materially shortened, thus effecting an economy in factory space. In the old type leer the entire apparatus was relatively wide open to the atmosphere and cold air entered the leer, particularly at the delivery end. The present invention, as above pointed out, effectually prevents the ingress of cold air at the delivery end. However, the additional suction provided hereby may be effective for drawing cool air into the system through one or more of the various openings in the flattening oven, thus tending to reduce in some measure the temperature of the gases flowing all the way through the leer and permitting a reduction in the length of the tunnel. The fact that a substantially smooth and continuous flow of gases is maintained and that the streams are adjustable in amount relative to one another insures the production of flat glass. It will be understood of course that cold air should not be permitted to enter in such amounts as would affect the quality of the product.

While I have illustrated the invention as applied to glass working apparatus wherein the heated gases are supplied from a chamber in which a previous operation is performed and in which the heated gases travel in the same direction as the glass, it will be understood that the invention is not limited to such forms, but may be otherwise embodied within the scope of the following claims.

I claim:

1. In the method of annealing and cooling sheet glass, the steps consisting in supplying flat hot glass to a horizontally extending leer tunnel, providing substantially smooth and continuous streams of gases through the tunnel above and below the glass level, and amplifying the cooling effect of the lower stream relative to the upper stream by increasing the velocity thereof above its natural velocity, substantially as described.

2. In the method of annealing and cooling sheet glass, the steps consisting in supplying flat hot glass to a horizontally extending leer tunnel, providing substantially smooth and continuous streams of gases to the leer tunnel adjacent one end thereof above and below the glass level, maintaining both the upper and the lower streams at velocities greater than the natural velocities of such streams, and regulating the velocity of the lower stream relative to the upper stream in such manner as to prevent warping or bowing of the glass sheet and thus produce substantially flat glass, substantially as described.

3. In the method of annealing and cooling sheet glass, the steps consisting in supplying flat hot glass to a horizontally extending leer tunnel, introducing streams of heated gases to the leer tunnel above and below the glass level adjacent the end of the leer tunnel where the glass enters and permitting the streams to flow through the leer tunnel in a substantially smooth and continuous manner, and maintaining the lower stream at a velocity greater than its natural velocity, whereby its cooling effect relative to the upper stream is altered, substantially as described.

4. In the method of annealing and cooling sheet glass, the steps consisting in supplying flat hot glass to a horizontally extending leer tunnel, introducing streams of heated gases to the leer tunnel above and below the glass level adjacent the end of the tunnel where the glass enters, providing suction adjacent the remote end of the tunnel for the upper and lower streams, whereby both streams are maintained at a velocity higher than their natural velocities, and providing a greater suction for the lower stream than for the upper stream to amplify the cooling effect of the lower stream relative to the upper stream, substantially as described 5. In the method of annealing and cooling sheet glass, the steps consisting in supplying flat hot glass to a horizontally extending leer tunnel, introducing heated gases from a chamber wherein a previous operation has been performed upon the glass, permitting the gases to travel through the leer tunnel in streams above and below the glass level, and maintaining the lower stream at a velocity above its natural velocity to amplify the cooling effect thereof, substantially as described.

6. In the method of annealing and cooling sheet glass, the steps consisting in supplying flat hot glass to a horizontally extending leer tunnel, passing streams of gases through the tunnel above and below the glass level and in contact with the glass regulating the velocity of the upper stream, and regulating the velocity of the lower stream relative to the upper stream, the regulation of such velocities being such as to prevent warping or bowing of the sheet and thus produce substantially flat sheet glass, substantially as described.

7. In the method of annealing and cooling sheet glass, the steps consisting in supplying flat hot glass to a horizontally extending leer tunnel, passing streams of gases through the tunnel above and below the glass level, increasing the velocity of the lower stream above its natural velocity, and regulating the velocity of the lower stream, substantially as described.

8. In the method of annealing and cooling sheet glass, the steps consisting in supplying flat hot glass to a horizontally extending leer tunnel, passing streams of heated gases through the leer tunnel above and below the glass level in the same direction as the glass is moved through the leer, and controlling the velocity of the lower stream to substantially equalize the rate of heat loss from the two faces of the glass, substantially as described.

9. Apparatus for annealing and cooling sheet glass, including a horizontally extending leer tunnel, means for supporting sheet glass therein spaced from the top and bottom of the tunnel, thus providing a gas space above and a gas space below the glass, means for introducing gaseous streams to such gas spaces, whereby the streams may travel through the tunnel above and below the glass and in contact therewith, and means for increasing the velocity of the lower stream above its natural velocity independently of the upper stream, substantially as described.

10. Apparatus for annealing and cooling sheet glass, including a horizontally extending leer tunnel, means for supporting sheet glass therein spaced from the top and the bottom of the tunnel, thus providing a gas space above the glass and a gas space therebelow, means for introducing heated gases to such spaces adjacent the end of the tunnel where the glass enters, whereby the gases may flow in streams through the tunnel above and below the glass and in contact therewith, and means for increasing the velocity of the lower stream independently of the upper stream, substantially as described.

11. Apparatus for annealing and cooling sheet glass, including a heated chamber wherein an operation is performed on the glass, a horizontally extending leer tunnel connected to the chamber, means for supporting sheet glass in the tunnel spaced from the top and the bottom thereof, thus providing a gas space above the glass and a gas space therebelow, the tunnel and chamber being so arranged as to permit flow of heated gases from the chamber into each of said gas spaces whereby the gas may flow in streams through the tunnel above and below the glass and in contact therewith, and means for increasing the velocity of the gas in the tunnel below the glass level independently of the upper stream, substantially as described.

12. Apparatus for working on sheet glass, including a flattening oven, a horizontally extending leer tunnel connected therewith, means for supporting sheet glass in the tunnel spaced from the top and bottom thereof, thus providing a gas space above the glass and a gas space therebelow, the tunnel and the flattening oven being so arranged as to permit flow of heated gases from the flattening oven to the gas spaces above and below the glass, whereby the gas may travel in streams above and below the glass and in contact therewith, means for increasing the velocity of both the upper and the lower streams, and means for controlling the velocity of the lower stream independently of the upper stream, substantially as described.

13. Apparatus for working on sheet glass, including a flattening oven, a horizontally extending leer tunnel connected therewith, means for supporting sheet glass in the tunnel spaced from the top and bottom thereof, thus providing a gas space above the glass and a gas space therebelow, the tunnel and the flattening oven being so arranged as to permit flow of heated gases from the flattening oven to the gas spaces above and below the glass, whereby the gas may travel in streams above and below the glass and in contact therewith, and means for increasing the velocity of the lower stream relative to the upper stream, substantially as described.

14. Apparatus for annealing and cooling sheet glass, including a horizontally extending leer tunnel, means for passing glass therethrough, said means being adapted to support the glass spaced from the top and bottom of the tunnel, thus providing a gas space above the glass and a gas space therebelow, means for supplying gaseous streams above and below the glass, whereby the gases may travel through the tunnel above and below the glass and in contact therewith, means for amplifying the velocity of the lower stream, and means for regulating the velocity thereof independently of the upper stream, substantially as described.

In testimony whereof I have hereunto set my hand.

WILLIAM L. MONRO.